United States Patent [19]
Herzog

[11] 3,882,567
[45] May 13, 1975

[54] WIPER BLADE ELEMENT

[75] Inventor: Rudolf Herzog, Plochingen, Germany

[73] Assignee: Feldmuhle Anlagen- und Produktionsgesellschaft mit beschrankter Haftung, Dusseldorf, Germany

[22] Filed: June 12, 1972

[21] Appl. No.: 263,750

[30] Foreign Application Priority Data
June 16, 1971 Germany.............................. 2129744

[52] U.S. Cl. ............................................ 15/250.36
[51] Int. Cl. ................................................ B60s 1/38
[58] Field of Search....... 15/250.36, 250.40, 250.41, 15/250.42; 300/21

[56] References Cited
UNITED STATES PATENTS
1,915,775  6/1933  Christen.......................... 15/250.36
3,035,297  5/1962  Overman et al. ................ 15/250.36

Primary Examiner—Peter Feldman
Attorney, Agent, or Firm—Hans Berman

[57] ABSTRACT

A wiper blade element for a windshield wiper consists of a unitary strip of synthetic or preferably natural rubber and of a coating of elastomeric polyurethane plastic covering the hinge portion of the element which connects the body portion, normally attached to a wiper arm, and the blade portion whose lip part slides over the windshield when in service. The plastic coating retards aging of the hinge part, a primary cause of malfunctioning of the wiper, and further improvement is provided by also coating the lip part except for its edge face.

9 Claims, 2 Drawing Figures

WIPER BLADE ELEMENT

This invention relates to windshield wipers, and particularly to an improved wiper element for a windshield wiper, and to a method of extending the useful service life of such an element.

In its more specific aspects, the invention is concerned with improvements in a known squeegee or wiper element of the type disclosed in U.S. Pat. No. 3,035,297 to Overmann et al. The wiper element with the improvement of which this invention is concerned, is an elongated rubber strip which has a body portion provided with recesses and projections for anchoring to a wiper arm, a blade portion which engages the windshield during normal operation, and a hinge portion of greatly reduced cross section which connects the body and blade portions so as to permit pivotal movement of the blade portion relative to the body portion when the latter is fixedly fastened to a wiper arm.

The best rubber compositions presently employed for making wiper elements consist mainly of natural rubber whose coefficient of friction in contact with glass is relatively high, but which imparts the necessary wear resistance to the element. In order to reduce the friction between the wiper element and a windshield, particularly a windshield not covered by a continuous film of water, it has been proposed to chlorinate the rubber surface. The chlorine treatment reduces friction by smoothing and hardening the rubber surface, and thereby reduces the chatter and squeak characteristic of soft rubber elements not so treated, but the service life of adequately chlorinated rubber elements is relatively short. The optimum balance between hardness and low coefficient of friction achieved in the newly manufactured element is lost during service as the element is exposed to the atmosphere, and particularly to atmospheric ozone, which further hardens the rubber. It has been proposed to incorporate stabilizers in rubber which retard the hardening or aging caused by ozone, but the stabilizers are washed out of the rubber surface, and some stabilizers have been found to cause discoloration of the paint on automative vehicles.

The primary object of the invention is the provision of a rubber element for a windshield wiper which combines the advantages of known elements with greater resistance to aging.

It has been found that the deterioration of conventional windshield wiper elements in service is caused to a very substantial extent by aging of the hinge portion due to ozone in the atmosphere which causes loss of flexibility or pliability in the hinge portion so that the blade portion proper, separated by the hinge portion from the body portion mounted on a wiper arm, no longer can conform to the varying shape of the windshield surface during each stroke of the wiper arm. Ozone also unfavorably affects the pliability of the thin lip part of the blade portion. It has further been found that aging of the hinge portion and also of the lip part can be retarded by applying to the rubber surfaces a plastic coating substantially impervious to ozone, yet thin enough not significantly to affect the mechanical properties of the strip of natural and/or synthetic rubber composition which constitutes the several portions of the wiper element. It is unavoidable, and actually beneficial, that the coating also cover adjacent surfaces of the body portion and of the blade portion.

In the wiper element of the invention, the lip part of the blade portion farthest removed from the hinge portion has a longitudinal edge face which engages the windshield during normal wiper operation. It is important that this edge face consist of rubber and be free of the plastic coating to preserve the desirable frictional properties of the element.

Other features, additional objects, and many of the attendant advantages of this invention will become apparent from the following detailed description of a preferred embodiment when considered in connection with the appended drawing in which.

Figure 1:
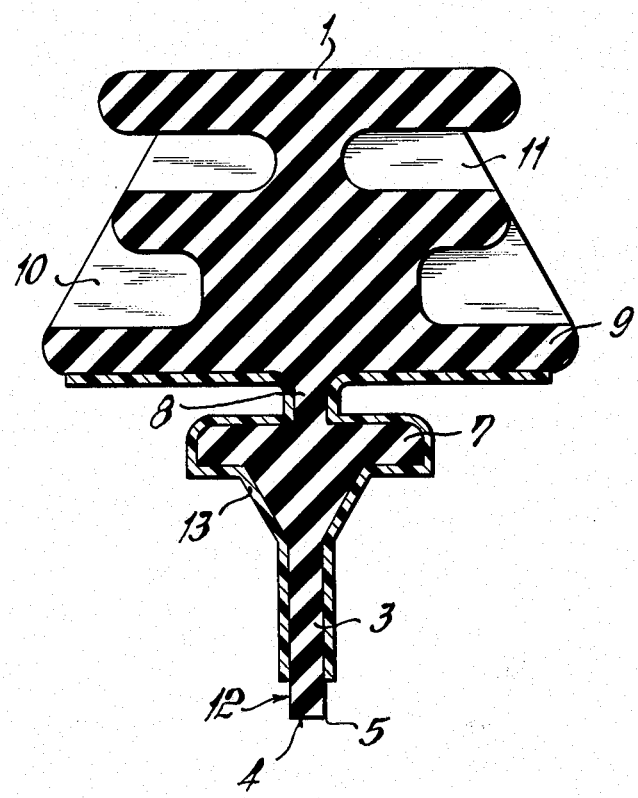
FIG. 1 shows a wiper element of the invention in cross section.

Referring initially to FIG. 1, there is seen a wiper element for an automotive windshield wiper which is of a basic shape known, for example, form the aforementioned Patent to Overman et al. The unitary rubber strip 1, which constitutes much of the wiper element, has a length at right angles to the plane of FIG. 1 which is many times the greatest dimension thereof seen in the drawing.

It has a body portion 9 formed with longitudinal grooves 10, 11 for engagement by the metal parts of the wiper arm, not itself seen and conventional. A hinge portion 8 connects the body portion to the blade portion consisting of a base part 7 contiguously adjacent the hinge portion 8, and tapering from the base part to a lip part 3 which has the cross-sectional shape of a narrow rectangle. The two wide, longitudinal side faces 12 of the lip part 3 are connected by a narrow, longitudinal edge face 4 which meets each side face at right angles, at least in the relaxed condition of a new blade element, along a longitudinal, linear edge 5.

When the wiper element is moved over the glass surface of a windshield, its lip part 3 bends under the frictional drag, and one of the edges 5 sweeps the glass surface, the associated side face 12 and the edge face 4 being obliquely inclined during the wiping stroke. As the direction of wiper movement is reversed, there is brief area contact between the edge face 4 and the glass surface, and the other edge 5 thereafter assumes most of the wiping action.

The wiper element and its operation, as described so far, are conventional. The wiper element of the invention differs from the known wiper blades by a plastic coating 13 which covers the entire available surface of the hinge portion 8, except for such unintentional and undesired minor defects as may occur under production conditions. The coating also covers the adjacent surfaces of the body portion 9 and of the blade portion. In the illustrated embodiment, only the edge face 4 and the immediately adjacent portions of the side faces 12 are free of the coating 13.

The coating thus does not interfere with the wiping action of the edges 5 and does not interfere with contact of the rubber exposed in the edge face 4 with the windshield during reversal of the wiping stroke. The thickness of the coating is but a small fraction of the thickness of the lip part 3 so that the mechanical properties, particularly the bending properties of the lip part 3 and of the somewhat thicker hinge portion 8 are not significantly affected by the presence of the coating.

Even a thin coating of a hard material or of a material having an elastic modulus very much different from that of the rubber strip 1 could spoil the wiping action of the blade, and it is therefore preferred that the coating material itself be elastomeric, as the term is commonly defined in this art, that is, have an elongation of at least 100 percent when failing in tension.

It is the primary function of the coating to impede or prevent aging of the sensitive portions of the rubber strip 1 under the influence of ozone in the atmosphere, and the plastic is further chosen for its imperviousness to ozone. Since the hinge portion 8 is integrally connected with the body portion 9 and the base part 7 of the blade portion, the adjacent parts of the body portion and the blade portion also are resiliently deformed during flexing of the hinge portion, and would impede the flexing of the hinge portion 8 at least to some degree if they were not protected against ozone attack.

The lip part 3 is flexed during each reversal of wiper arm movement, as described above, and significant improvement in the useful life of the wiper element is achieved by also protecting the thin lip part 3 against ozone. The edge face 4 and the adjacent portion of the side faces 12 perform their wiping function adequately when slightly hardened by aging. Keeping them exposed thus is not as harmful as would be exposure of the flexed portion of the lip part 3. The surface portions of the base part 7 about equally remote from the lip part 3 and the hinge portion 8 derive little benefit from the coating, but a continuous and approximately uniform coating extending from the body portion 9 to a line spacedly adjacent each edge 5 is most conveniently applied.

Among the commercially available elastomeric synthetic resin compositions, commonly referred to as elastomeric plastics, that combine the necessary mechanical properties with ozone resistance and adequate adhesion to rubber, the polyurethanes are preferred, and the best material found up to this time is a moisture-curing, single-component polyurethane lacquer for rubber which, when free from pigments, contains 33 to 37 percent solids in an anhydrous aromatic solvent system (toluene, xylene, having a flash point of 14°C as determined by German Industrial Standard DIN 53213 according to Abel-Pensky). The lacquer, as supplied by the manufacturer, has a viscosity of 20 – 50 cp at 25°C (Brookfield viscosimeter, model LVT, 30 r.p.m., spindle No. 2) and may be thinned with anhydrous toluene or xylene as needed. After evaporation of the solvent, the resin composition is cured at ambient temperature by contact with atmospheric moisture in a few hours, and within a few minutes at moderately elevated temperature. The coating has an elongation of about 200 percent at the breaking point and retains its flexibility at temperatures as low as −30°C.

For best adhesion of the lacquer, the rubber should be cleaned of all foreign matter prior to lacquering, a strongly alkaline, hot, aqueous cleaner being preferred. It may be prepared by dissolving trisodium phosphate and sodium silicate in water, but numerous commercial products commonly used for cleaning steel prior to painting or electroplating are available and may contain synthetic anionic detergents in addition to the salts mentioned. Dipping of the rubber strip in the hot alkaline cleaner solution is normally adequate. Wiping with a suitable organic solvent may be adequate for lightly contaminated strip.

Figure 2:
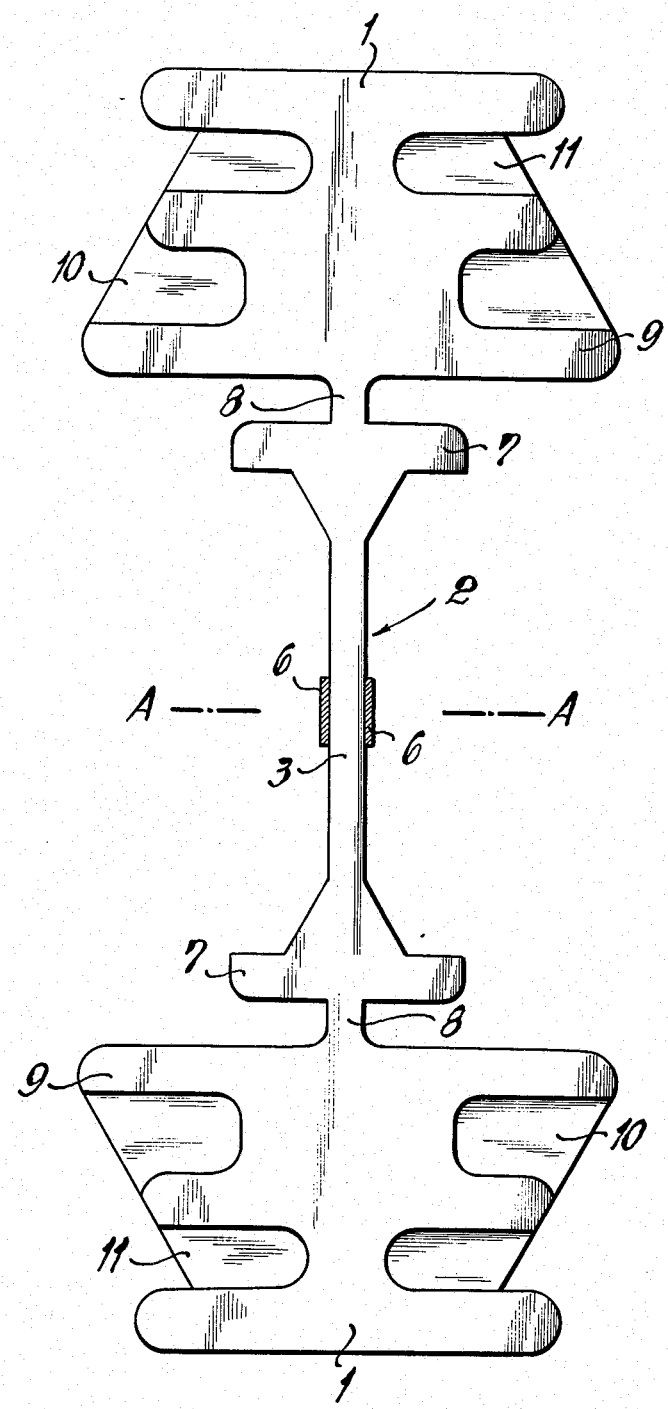
FIG. 2 is an end view of a rubber blank from which the element of FIG. 1 is prepared.

If it is desired to chlorinate the side faces 12 of the lip part 3, a blank 2, shown in FIG. 2, is molded. It essentially consists of two strips 1 integrally joined at their edge faces. The blank 2 is cleaned as described above, rinsed, and thereafter chlorinated by immersion for 2 – 3 minutes in an acidified sodium hypochlorite solution prepared by mixing 5 parts sodium hypochlorite solution containing 13 percent available chlorine, 0.5 part concentrated hydrochloric acid, and 94.5 parts water, all parts being by volume. The light surface chlorination achieved by this treatment does not extend to the edge faces 4 which are formed after the chlorine treatment by slitting the blank 2 along the line A — A, but the increased hardness of the edges 5 slightly reduces friction and may be beneficial, although very good wiper elements of the invention have been prepared without chlorination.

The cleaned blank 2 is rinsed again, if chlorinated, and dried before being coated with lacquer. If the lacquer coating is applied by spraying, a masking tape 6 is applied on either side of the joined lip parts 3, and the lacquer described above is thinned with aromatic hydrocarbon solvent to suit the characteristics of the gun and the air pressure employed, as is conventional. Dilution with ½ to 2 volumes toluene has been found useful under most conditions. The body portions 9 are held during spraying in non-illustrated clamps which simultaneously serve as masks to limit the lacquer coating to the areas evident from FIG. 1. If a conforming roller is employed for applying the lacquer, thinning and masking may be unnecessary. Adequately uniform coatings have also been produced by dipping the masked blank 2 in a suitably thinned lacquer solution.

In whichever manner applied, the dried and cured lacquer coating should have a thickness of preferably 10 to 50 $\mu$, best results being obtained with the aforedescribed polyurethane lacquer with a coating approximately 30 $\mu$ thick. For production on an industrial scale, the coated blanks 2 are passed through a tunnel oven for contact with hot air at about 80°C which removes the solvent, and thereafter through an oven having an atmosphere heated and moistened by injected steam for quickly curing or cross-linking the polyurethane.

The width of the rubber surface exposed after spray-lacquering on the side walls 12 near the edges 5 may be controlled by selecting the width of the masking tape 6 or by performing a double cut which removes the central portion of the tape 6 and the corresponding portion of the blank 2. The exposed width can be made as great as 1 mm or as small as 0.1 mm without unduly affecting the wiping performance. If the exposed rubber surface is narrow, the edge of the lacquer coating may engage the glass surface and it is preferred to reduce friction between the lacquer and the glass by means of a suitable pigment uniformly distributed in the lacquer prior to application. Suitable pigments include titania, ferric oxide, and green chromic oxide, but carbon black is preferred. The pigment may amount to 10 to 90 percent of the polyurethane in the cured lacquer, and the latter may further contain a small amount of a delustering agent to make the lacquer coating inconspicuous. Typically, a coating composition to be applied by roller may contain 6 percent carbon black, 20 percent resin solids, 1 percent hydrated silicon dioxide as a delustering agent, all percentage values being by weight, and the balance being anhydrous toluene and/or xylene.

The strip 1 may be prepared in a known manner by extruding a suitable rubber composition including a vulcanizing agent in the cross-sectional shape of the blank 2, and by cutting the extruded material to the desired length and width prior to vulcanizing. It has been found practical to lacquer the material as it leaves the extruder in continuous length, to dry the lacquer, to cut the lacquered strip, and thereafter simultaneously to cure the lacquer and vulcanize the rubber strips while the lacquered strips travel on a wire screen through a tunnel oven.

It should be understood, of course, that the foregoing disclosure relates only to preferred embodiments of the invention and that it is intended to cover all changes and modifications in the examples of the invention herein chosen for the purpose of the disclosure which do not constitute departures from the spirit and scope of the appended claims.

What is claimed is:

1. An elongated windshield wiper element essentially consisting of
   a. a unitary rubber strip having a body portion, a blade portion, and a hinge portion of reduced cross section integrally connecting said blade portion to said body portion, said blade portion having a base part contiguously adjacent said hinge portion and tapering from said base part in a direction away from said hinge portion to constitute a lip part, said portions extending over substantially the entire length of said strip; and
   b. a thin, pliable coating of synthetic resin composition substantially impervious to ozone covering substantially the entire surface of said hinge portion and covering the surfaces of said body portion and said blade portion adjacent said hinge portion, said lip part having an exposed, longitudinal edge face of rubber, said edge face being free from said coating.

2. An element as set forth in claim 1, wherein said body portion has a surface of exposed rubber much greater than the surface thereof covered by said coating.

3. An element as set forth in claim 1, wherein the thickness of said coating is but a small fraction of the thickness of said lip part transversely of said direction and of the elongation of said strip.

4. An element as set forth in claim 1, wherein said resin composition is a synthetic elastomer.

5. An element as set forth in claim 4, wherein said elastomer is a polyurethane.

6. An element as set forth in claim 5, wherein said coating contains a pigment selected from the group consisting of titania, ferric oxide, chromic oxide, and carbon black in an amount of 10 to 90 percent of the weight of said polyurethane.

7. An element as set forth in claim 1, wherein said lip part has two longitudinal side faces connected by said edge face, respective elongated portions of said side faces contiguously adjacent said edge face being free from said coating.

8. An element as set forth in claim 7, wherein said elongated portions of said side faces have each a width of 0.1 to 1 mm, the thickness of said coating being between 10 $\mu$ and 50 $\mu$.

9. An element as set forth in claim 1, wherein said composition resists hardening by contact with atmospheric ozone over a longer period than said rubber in said hinge portion, said hinge portion being protected from contact with said atmospheric ozone by said coating.

* * * * *